United States Patent [19]
Lundahl

[11] 3,809,269
[45] May 7, 1974

[54] SIDE PRESS HAY WAGON

[75] Inventor: Ezra Cordell Lundahl, Idaho Falls, Idaho

[73] Assignee: Ezra C. Lundahl, Inc., Logan, Utah

[22] Filed: Mar. 9, 1972

[21] Appl. No.: 233,167

[52] U.S. Cl.............. 214/519, 214/83.3, 100/278, 100/218, 193/30
[51] Int. Cl............................................ A01d 85/00
[58] Field of Search .......... 214/83.3; 100/218, 245, 100/295, 278, 100

[56] References Cited
UNITED STATES PATENTS

| | | | |
|---|---|---|---|
| 3,691,741 | 9/1972 | White et al. ........................ | 214/83.3 |
| 3,412,532 | 11/1968 | Nickla................................ | 214/83.3 |
| 2,552,888 | 5/1951 | Druetta............................... | 100/100 |
| 3,556,327 | 1/1971 | Garrison ............................. | 100/218 |
| 2,653,724 | 9/1953 | McBribe ............................. | 214/83.3 |

*Primary Examiner*—Gerald M. Forlenza
*Assistant Examiner*—Kenneth Noland
*Attorney, Agent, or Firm*—Lynn G. Foster

[57] ABSTRACT

A hay wagon comprising a bed, pick up and haying displacing mechanisms for delivering loose hay from the ground onto said bed in stacked relation, a pressing mechanism for principally compacting side edges of the hay stack and a stack discharging mechanism for unloading the compacted hay stack from the bed.

14 Claims, 8 Drawing Figures

SIDE PRESS HAY WAGON

BACKGROUND

1. Field of Invention

This invention relates to hay wagons and particularly to wagons for receiving and compacting loose hay into a stack and transporting the hay stack to a desired location for discharge as a unit.

2. Prior Art

As is well known, hay is an essential feed for livestock and, consequently, hay production is an important agricultural activity. Hay is produced during the summer and is stored for feeding to the livestock during the winter. In many parts of the country, hay is packed into bales, weighing approximately 50–100 pounds, which are packed into barns, sheds, or the like, for storage and are removed, as needed, for delivery to the livestock. However, in other parts of the country, particularly in parts of the West, where mountainous terrain and heavy snows may make it difficult or impossible to deliver the hay to the livestock in winter, it is customary to store the hay, without baling, in stacks in or near the field. Historically, this has been accomplished by manually loading the hay from the field onto a wagon and, when the wagon is filled, from the wagon onto a stack. Obviously, much time and effort are required for such an operation. Furthermore, hay is frequently gathered in a race against time before an oncoming storm, since hay which is gathered and stacked or baled, when wet, is subject to rotting and spontaneous combustion. The latter is especially dangerous since it can cause fires which may destroy the hay and spread to adjacent buildings and fields. If the hay is gathered dry, it is less susceptible to such rain damage, even if the hay is simply stacked, since the rain normally penetrates only the outer layers of the hay stack, which can be subsequently dried by the sun. However, some possibility of such rain damage still exists. Moreover, repeated wetting and drying of the outer layers tends to make the leaves become brittle and crumble away, leaving only the stems and greatly reducing the nutritional value of the hay. Baled hay is much less susceptible to such damage since the compaction of the hay during baling causes the hay to be much more dense and less permeable to the rain. Unfortunately, bales are conventionally secured with wire or string which is inedible by livestock. Moreover, where access is difficult or impossible for delivering bales to the livestock, access is frequently equally difficult or impossible for removing the wires or string from stacked bales.

BRIEF SUMMARY AND OBJECTS OF INVENTION

These disadvantages of the prior art are overcome with the present invention and a hay gathering method and apparatus are disclosed which provides most of the advantages of both stacked and baled hay, while eliminating most of the disadvantages. Moreover, the technique of the present invention greatly reduces the time and effort required for hay gathering operations.

The advantages of the present invention are preferably attained by providing a hay wagon including mechanisms for picking up loose hay from the ground and stacking it in a wagon, mechanism for compacting side edges of the hay as it is being built, and a mechanism for unloading as a self-contained unit the compacted hay stack when built, which requires no inedible securing means.

Accordingly, it is a primary object of the present invention to provide improved methods and apparatus for gathering and forming loose hay into stacks.

Another paramount object of the present invention is to provide apparatus for compacting a wagon-load of loose hay.

A further important object of the present invention is to provide methods and apparatus for providing a compacted stack of hay which is self-contained and requires no inedible binders.

It is a further significant object of the invention to provide a method and apparatus for creating hay stacks of loose haying comprising side edge, at least in part horizontal compaction of each stack.

Another key object is the provision of loose hay compaction structure and methods which press the hay along the sides in both the horizontal and vertical directions to form a stack.

A specific object of the present invention is to provide a hay wagon comprising a platform, structure for loading loose hay from the ground onto the platform as a stack, structure for compacting side edges of the loaded hay, and structure for unloading the compacted hay stack from the platform.

These and other objects and features of the present invention will be apparent from the following detailed description, taken with reference to the accompanying drawings.

DETAILED DESCRIPTION OF ILLUSTRATED EMBODIMENT

Figure 1:
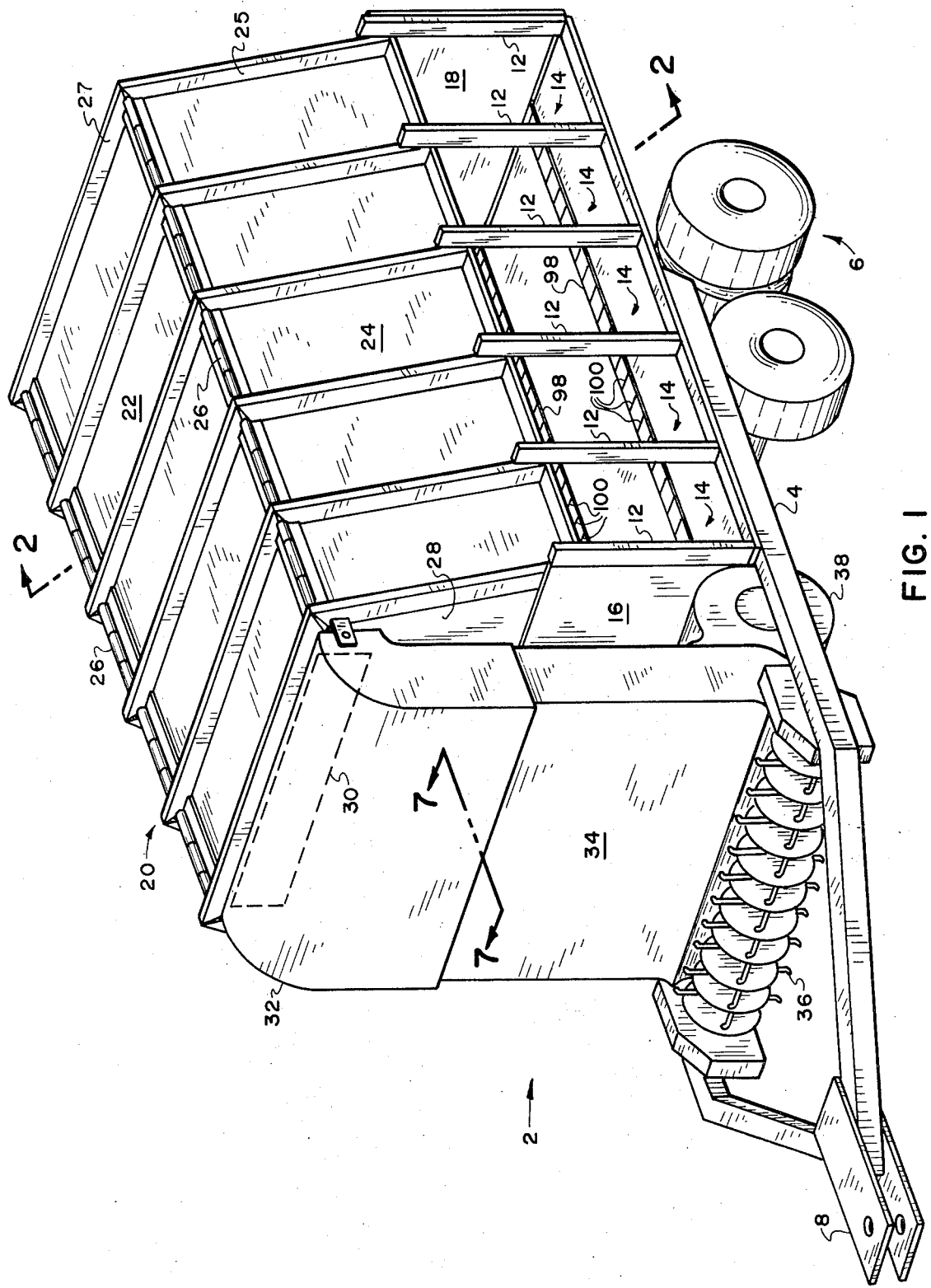
FIG. 1 is an isometric view of a hay wagon embodying the present invention.

In that form of the present invention chosen for purposes of illustration, FIG. 1 shows a hay wagon, indicated generally at 2, having a frame 4, supported by suitable suspension system 6, and having a hitch 8, for permitting the wagon to be pulled by a tractor or the like. The suspension system 6 may be of any suitable type, but is preferably of the type shown and described in my copending patent application, Ser. No. 117,574, filed Feb. 2, 1971.

Figure 2:
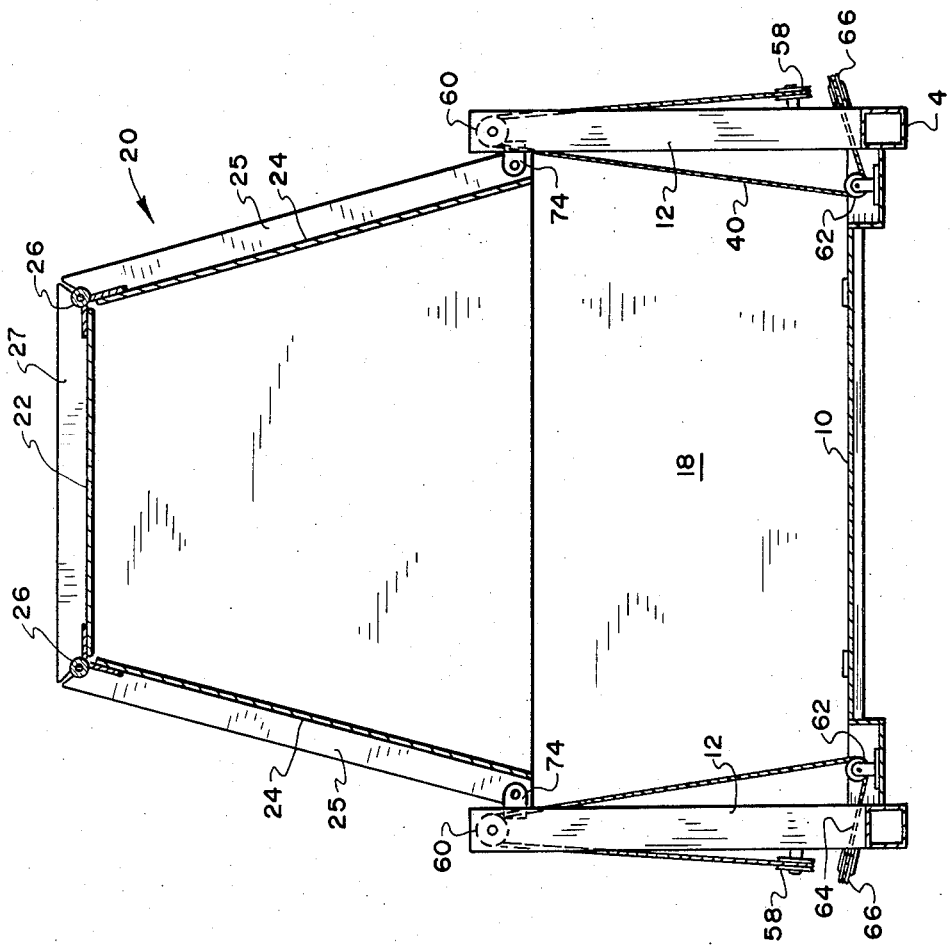
FIG. 2 is a vertical section through the wagon of FIG. 1, taken on the line 2—2 thereof.
Figure 3:
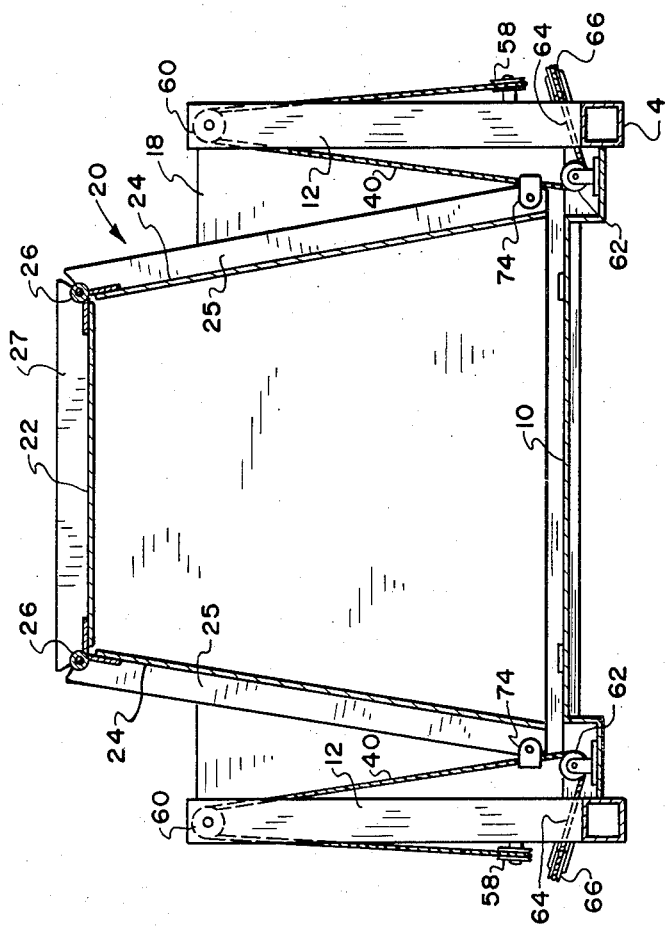
FIG. 3 is a view similar to that of FIG. 2 showing the compacting hood in its lowered position.

A flat bed or platform 10 is mounted on the frame 4 and a plurality of vertical channel members or stanchions 12 are rigidly mounted in spaced relation along each side of the bed 10. The spaces 14 between the stanchions 12 may be panelled, screened or completely open, as desired. However, the bed 10 is preferably provided with a fixed, vertical front wall 16 and a vertical rear door or tail-gate 18 which is either removable or hinged for opening to permit removal of the compacted hay. A compacting hood 20 is mounted for vertical, reciprocal movement above the bed 10 between a raised position, as seen in FIGS. 1 and 2, and a maximum lowered position, as seen in FIG. 3. The commpacting hood 20 is hollow and is generally in the form of a truncated pyramid having a flat top 22 and inclined side walls 24 hinged to the top 22, as seen at 26. Each side wall 24 is reinforced by a plurality of spaced, generally vertically extending stiffeners 25, as is top wall 22 by stiffeners 27.

Figure 7:
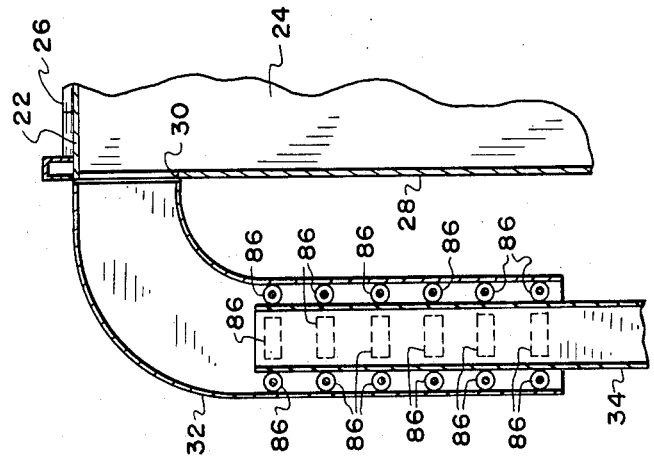
FIG. 7 is a section through a portion of the air chute of the wagon of FIG. 1, taken on the line 7—7 thereof.

The front wall 28 of the compacting hood 20 is rigidly secured to the top 22 and is formed with an opening 30 (FIG. 7). A chute 32 is secured to the front wall 28 of the compacting hood 20, such as by welding or bolts, and projects forwardly from front wall 28 a sufficient distance to clear the front wall 16 of the bed 10 and then extends downward into telescoping relation about a lower chute 34. The lower chute 34 preferably forms part of a pneumatic delivery system, including a rotary pick up rake 36 and blower 38 for delivering hay from the ground onto the bed 10 through opening 30. The hay delivery system is preferably of the type shown and described in my copending patent application, Ser. No. 195,549, filed Nov. 4, 1971. However, it will be apparent that other arrangements could be employed to pick the loose hay from the ground and deliver it onto the bed 10.

Figure 6:
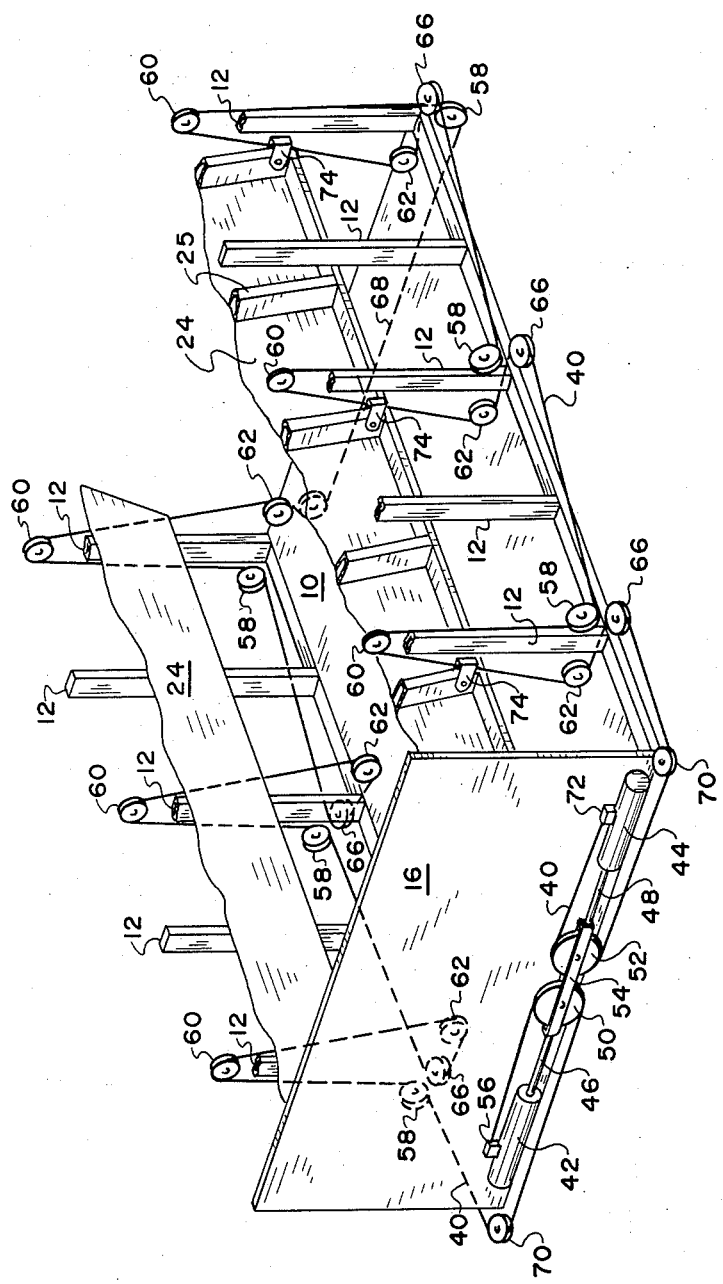
FIG. 6 is a diagrammatic representation showing the arrangement of the cable for actuating the compacting hood of the wagon of FIG. 1.

As best seen in FIGS. 2, 3 and 6, the compacting hood 20 is supported and reciprocated by a continuous cable 40 actuated by a pair of opposed fluid cylinders 42 and 44 which are mounted adjacent the front wall 16 of the bed 10. The piston rods 46 and 48 of the fluid cylinders each carry pulleys 50 and 52 at their outer ends and the pulleys 50 and 52 are coupled for movement together, as by strap 54. One end of the cable 40 is secured by a suitable anchor 56 and the cable 40 passes about pulley 50 and, thence, about pulley 56 and travels parallel to the side of the wagon 2 to pulley 58 at the base of the first channel member 12. Thereafter, the cable 40 passes upward along the outside of the channel member 12, passes over pulley 60 at the top of the channel member 12, extends downward about pulley 62, and passes through opening 64 in the base of the channel member 12 and about pulley 66 to the pulley 58 at the base of the next channel member 12. At the rear of the wagon 2, the cable 40 passes under the bed 10, as seen at 68, to the pulley 58 adjacent the rearmost one of the channel members 12 on the opposite side of the wagon 2. After leaving the pulley 66 at the last of the channel member 12, the cable 40 passes about pulleys 70 and 52 to anchor 72. As shown, the cable 40 passes about alternate ones of the channel members 12. However, it will be obvious that the cable 40 could be arranged to pass about all or any selected ones of the channel members 12. The lower edges of the side walls 24 of the compacting hood 20 are secured, by suitable anchors 74, to the portions of the cable 40 extending between the upper pulleys 60 and the pulleys 62. As shown, each of the pulleys 62 is mounted on the bed 10 at a point spaced inwardly from the base of the adjacent channel member 12. Thus, as the compacting hood 20 is lowered, the side walls 24 will be moved inwardly from a position in engagement with the channel members 12, as seen in FIG. 2, to the position seen in FIG. 3. Consequently, the top 22 of the compacting hood 20 seldom if ever applies vertical pressure to the hay, while the side walls 24 apply a substantial horizontally directed pressure to the side edges of loose hay as it is built into a stack. It is to be appreciated that in the illustrated configuration, a small vertical component of pressure is exerted upon the side edges of the hay stack. Of course, the configuration can be varied to eliminate or increase the vertical component of pressure.

Figure 4:
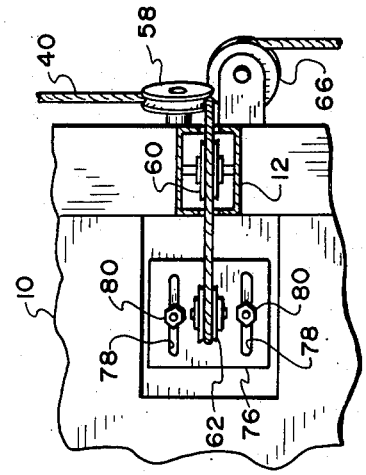
FIG. 4 is an enlarged plan view of a detail of the device of FIG. 2.
Figure 5:
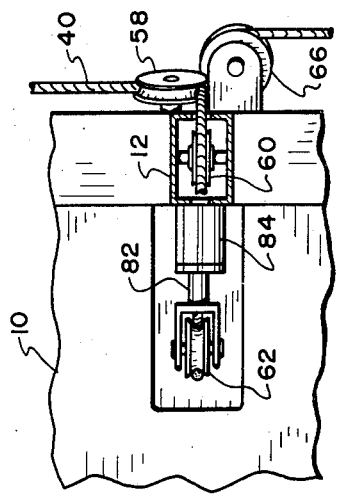
FIG. 5 is a view similar to that of FIG. 4 showing an alternative form of the mechanism shown in FIG. 4.

As is well known, dry hay can be compacted more readily than wet hay. Consequently, it may be desirable to provide means for adjusting the position of the pulleys 62 to provide greater or lesser lateral force. To accomplish this, as seen in FIG. 4, the pulleys 62 are provided with floor plates 76 having slots 78 to receive bolts 80 which extend through the bed 10. To adjust the position of the pulley 62, the bolts 80 are loosened and the floor plate 76 is moved toward or away from the channel member 12, whereupon, the bolts 80 are retightened to secure the pulley 62 in the new position. In some instances, the wetness of the hay may be unknown or may vary. To accommodate these situations, the pulley 62 may be mounted on the piston rod 82 of a fluid cylinder 84, as seen in FIG. 5. When this is done, the position of the pulley 62 may be adjusted by varying the fluid pressure within the fluid cylinder 84 and the fluid cylinder 84 will act as a shock absorber in case of overload. If desired, or where necessary to provide complete vertical compaction of the hay, the pulleys 62 may be recessed in the bed 10 or mounted below the bed 10 with openings formed in the bed 10 to permit passage of the cable 40 to the pulleys 62.

In some instances, the hay may become unevenly distributed or compacted across the width of the wagon 2 and may tend to cause the roof 22 of the compacting hood 20 to tilt about its longitudinal axis. Since the roof 22 of the compacting hood 20 is rigidly secured to the front wall 28 and chute 32, these latter components will tend to resist any tilting action by the roof 22. However, the tilting may cause binding between the chute 32 and lower chute 34. To reduce the likelihood of such binding, a plurality of rollers 86 are preferably interposed between the chute 32 and lower chute 34 on the front, back and all sides, as seen in FIG. 7.

Figure 8:
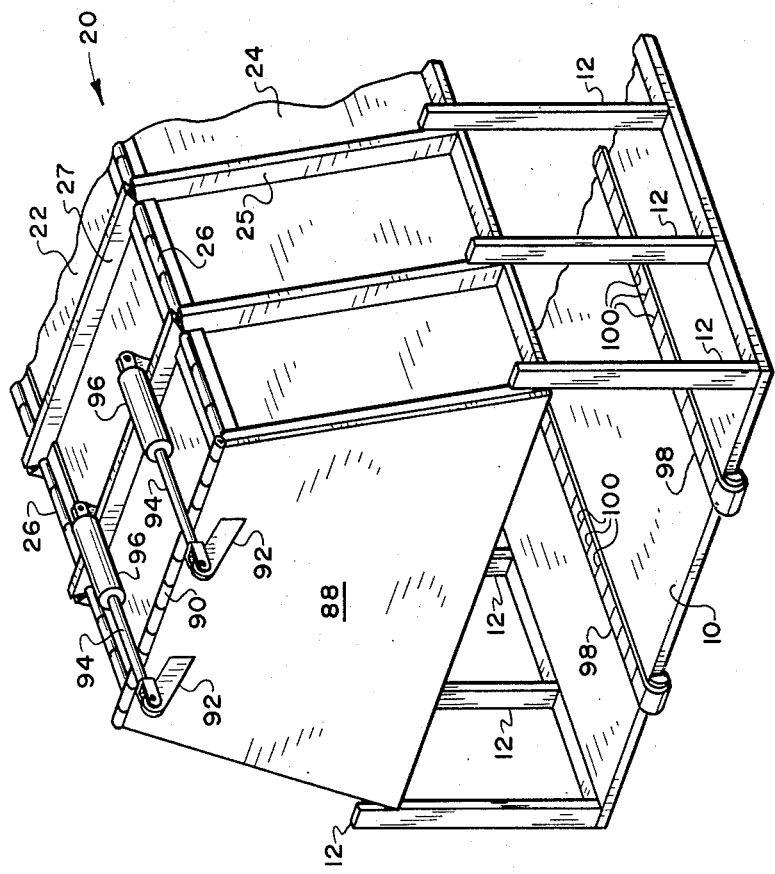
FIG. 8 is a partial isometric rear view of the hay wagon of FIG. 1.

To remove the compacted hay, the rear door 18 is opened or removed from the bed 10. Also, the rear wall 88 of the compacting hood 20 is hinged to the roof 22, as seen at 90 in FIG. 8. A pair of lever arms 92 project outwardly and upwardly from the outer surface of the rear wall 88 and are connected to the piston rods 94 of a pair of fluid cylinders 96. Finally, a pair of spaced endless tracks 98 having cleats 100 carried thereby are disposed lengthwise of the bed 10 and are operable to eject the compacted hay from the wagon 2.

In use, the compacting hood 20 is initially in the lowered position, seen in FIG. 3. As the wagon 2 is pulled through the hay field, the mown hay is picked up from the ground by the rotary rake 36 and is delivered, by air from blower 38 through chutes 34 and 32 and opening 30 onto the bed 10 within the compacting hood 20. As the level of the loose hay, thus delivered, approaches the roof 22 of the compacting hood 20, the compacting hood 20 is gradually raised, by actuating fluid cylinders 42 and 44, until it reaches the position shown in FIGS. 1 and 2. When the compacting hood 20 is in its upper position and is filled with loose hay, the wagon 2 is stopped and fluid cylinders 42 and 44 are actuated to cause the cable 40 to lower the compacting hood 20. The compacting hood 20 may be reciprocated to compact the hay at any desired point in time. As the compacting hood 20 starts to move downward, the hay beneath it will be compacted and the resistance of the hay to such compaction will tend to retain the side walls 24 in engagement with the channel member 12. However, as the compacting hood 20 approaches the bed 10, the cable 40 will apply an increasingly strong lateral component of force to draw the lower edges of the side walls 24 away from the channel members 12 toward the pulleys 62 and cause lateral compaction of the hay. After the compacting hood 20 has completed its movement to the position of FIG. 3 or as near thereto as permitted by the hay load, the compacting hood 20 is raised to its upper position, as seen in FIGS. 1 and 2, and the wagon 2 is pulled forward again to resume delivery of loose hay from the ground to within the compacting hood 20. The foregoing operations are repeated until, with the compacting hood 20 in the raised position of FIGS. 1 and 2, the area between the compacting hood 20 and the bed 10 is filled with a stack of compacted hay. At this point, the wagon 2 is pulled to a desired unloading point and the rear door 18 of the bed 10 is opened or removed. Next, the fluid cylinders 96 are actuated to cause the rear wall 88 of the compacting hood 20 to pivot about hinge 90 to its open position. Finally, the tracks 98 are actuated to eject the compacted hay stack from the wagon 2.

Obviously, numerous variations and modifications may be made without departing from the present invention. Accordingly, it should be clearly understood that the form of the present invention described above and shown in the accompanying drawings is illustrative only and is not intended to limit the scope of the present invention.

What is claimed is:

1. A loose foliage wagon for green edible crops comprising:
    a bed upon which the green edible crop is loosely stacked,
    spaced longitudinally extending side wall means along opposite edges of said bed;
    delivery means for depositing from an elevated position loose green crop obtained from the ground onto said bed between said side wall means in stacked relation,
    said side wall means comprising elevated longitudinally extending vertically projecting compacting side wall means, means for vertically lowering the compacting means into compressing relation with the longitudinal side edges of the green crop on the bed and lateral force-applying means horizontally reciprocating at least a portion of the compacting means when said compacting means are engaging the green crop to generally simultaneously vertically and laterally compact and thereby substantially seal the longitudinal side edges of the green crop on said bed; and
    means for unloading the compacted green crop stack from said bed.

2. A loose crop wagon comprising:
    a bed upon which loose crop is stacked,
    delivery means for depositing loose crop obtained from the ground onto said bed in stacked relation,
    compacting means comprising power means and means displacing the power means to laterally compact the side edges of the crop into a stack as it is placed on said bed,
    said power means further comprising roof structure extending substantially parallel with said bed, and at least two generally vertically disposed side walls respectively pivotally secured to opposite edges of said roof structure, each side wall being inclining outwardly and downwardly from said secured site, the power means of the compacting means also comprising actuating means for reciprocating said roof structure and said side walls up and down vertically above said bed and for causing said side members to convergently swing towards each other during the downward stroke of the reciprocation to compact the crop, and
    means for unloading the compacted crop stack from said bed.

3. The crop wagon of claim 2 wherein said actuating means comprises:
    a plurality of vertically extending support members mounted in spaced relation along the opposite sides of said bed,
    a plurality of pulleys each mounted on said bed adjacent the base of a respective one of said support members and spaced inwardly therefrom,
    cable means extending over the upper ends of said support members and passing downward and about said pulleys,
    anchor means movably securing said side walls to said cable means for movement with said cable means, and
    means for driving said cable means to move said side walls between a first position adjacent the upper ends of said support members and a second lower position.

4. The apparatus of claim 3 wherein:
    said pulleys are mounted by means for adjustably positioning the pulleys toward and away from the adjacent support members.

5. The apparatus of claim 4 wherein:
    said pulleys are mounted by means for mechanically adjusting the position of the pulleys toward and away from the adjacent support members.

6. The apparatus of claim 3 further comprising:
    a pair of opposed fluid cylinders each having a piston rod with means connecting the two piston rods for joint reciprocation, and
    means rotatably mounting the cable to each piston rod for movement with the piston rods causing the cable to lower and elevate the compacting means.

7. The method of gathering green edible foliage comprising the steps of:
    loading loose green foliage from the ground onto a flat bed of a wagon,
    periodically rectilinearly lowering a side wall edge compactor of a receptacle into engagement with at least one longitudinal side edge of the loaded green foliage,
    exerting downward pressure upon said foliage side edge and also laterally swinging at least part of the side wall edge compactor inwardly against said side edge of the loaded green foliage to both vertically and laterally compact said foliage side edge on said flat bed; and returning the compactor to an elevated position well above the compacted crop following each lowering step.

8. The method of claim 7 wherein:

said laterally displacing step is performed by applying a gradually increasing inwardly directed lateral force from a fulcrum directly above the foliage side edge to said foliage substantially throughout each period of time when the compactor is engaging the foliage.

9. A hay wagon comprising:

a generally flat bed, delivery means including a vertically oriented chute for delivering loose hay from the ground, a compacting hood comprising:

a roof member extending above said bed substantially parallel therewith, a wall member rigidly secured to said roof member extending downward from said roof member and formed with an opening extending therethrough, a curved chute rigidly secured to said wall member about said opening and projecting outward from said wall member and downward into telescoping relation about said vertically oriented chute, friction reducing means interposed between said curved chute and said vertically oriented chute, and actuating means for vertically reciprocating said compacting hood with respect to said bed.

10. The hay wagon of claim 9 wherein:

said compacting hood further comprises:

a pair of side walls each hingedly secured to a respective side of said roof member and inclining outwardly and downwardly therefrom, and said actuating means serves to pivot said side walls toward each other as said compacting hood approaches the lower limit of its movement.

11. A method of creating a compacted stack of foliage comprising:

machine-placing loose foliage in a vehicle in vertically stacked relation on a bed between longitudinally directed vertically extending spaced side walls, displacing at least a portion of said vertically extending spaced side walls longitudinally downwardly and transversely inwardly thereby bi-directionally compressing both longitudinal side edges of the stacked foliage downwardly and also oppositely displacing the same foliage edges toward the center of the vehicle, and generally vertically elevating the displaced side walls of the vehicle away from the foliage following the compressing step.

12. A crop wagon comprising a vehicle with a receptacle for receiving loose foliage, normally elevated compacting means comprising at least one side wall portion of a receptacle mounted to at least one stationary side of the vehicle directly above one stationary longitudinal edge of the receptacle for vertically and horizontally compacting the adjacent longitudinal side edge of the foliage to form a self-sustaining stack, and means for rectilinearly translating the side wall compacting means downwardly and means for laterally swinging at least part of the side wall compacting means inwardly causing the compacting means to lower upon, engage, vertically compact and horizontally displace and compress said longitudinal side edge of the stacked foliage.

13. A loose crop wagon comprising:

a bed upon which crop is loosely stacked, delivery means for depositing from an elevated position loose crop obtained from the ground onto said bed in stacked relation, the delivery means comprising a blower system having a telescopic crop delivery chute which extends and retracts as the compacting means move up and down, elevated compacting means, means vertically reciprocating the compacting means into and out of compressing relation with crop on the bed and lateral force-applying means horizontally reciprocating at least a portion of the compacting means when said compacting means are engaging the crop to laterally compact the side edges of the crop on said bed, and means for unloading the compacted crop stack from said bed.

14. A crop wagon comprising:

a receptacle having a bottom and side walls for receiving loose crop to be compacted into a stack, a longitudinally extending edge compactor having outwardly and downwardly inclined longitudinally extending edge compacting side walls mounted for vertical reciprocal movement within said receptacle, power means cooperating with the side walls of the receptacle for vertically reciprocating the side walls of said edge compactor into and out of pressure-applying relation with the side edges of the crop stack, means displacing the lower edge of each crop-engaging compactor side wall inwardly to laterally displace and compact both side edges of the crop stack, and unloading means for aiding in discharging a compacted crop stack from said receptacle.

* * * * *